United States Patent [19]

Tanaka

[11] Patent Number: 4,827,126
[45] Date of Patent: May 2, 1989

[54] LIGHT BEAM SCANNING APPARATUS

[75] Inventor: Kazuyoshi Tanaka, Tokyo, Japan

[73] Assignee: Fuji Photo Film Co., Ltd., Kanagawa, Japan

[21] Appl. No.: 63,609

[22] Filed: Jun. 18, 1987

[30] Foreign Application Priority Data

Jun. 18, 1986 [JP] Japan ................................. 61-142589

[51] Int. Cl.⁴ .............................................. H01J 3/14
[52] U.S. Cl. ..................................... 250/235; 250/227
[58] Field of Search ............... 250/227, 235, 236, 234; 358/293

[56] References Cited

U.S. PATENT DOCUMENTS 4,602,154 7/1986 Taniguchi ............................ 358/293

OTHER PUBLICATIONS

D. H. Cronquist, Hollow Reflecting Light Collector Tube, IBM Technical Discl. 8-74, vol. 17, No. 3, 906-908.

L. B. Richards, Photodetector as Function Detector, IBM Technical Discl. 8-70, vol. 13, No. 3, 591-592.

Primary Examiner—David C. Nelms
Attorney, Agent, or Firm—Sughrue, Mion, Zinn, Macpeak & Seas

[57] ABSTRACT

A light guide of an elongate shape having rectangular cross section, e.g., a quandrangular prism, directs, toward a light detector, either light emitted by applying a scanning light beam to an object and indicative of image information or a synchronizing light beam divided from the scanning light beam. The light guide has at least one outwardly spread end at which the light detector is disposed. The emitted light or the synchronizing light beam which has entered the light guide is totally reflected in the light guide by an inclined surface thereof progressively inclined in a direction toward the spread end, so as to be directed toward the light detector.

10 Claims, 5 Drawing Sheets

LIGHT BEAM SCANNING APPARATUS

BACKGROUND OF THE INVENTION

The present invention relates to a light beam scanning apparatus, and more particularly to a light beam scanning apparatus capable of applying a light beam having passed through a grating, efficiently to a light detector in order to generate a synchronizing signal for accurately reading an image from and/or recording an image on a stimulable phosphor sheet through application of light to the stimulable phosphor sheet.

Light beam scanning apparatus are widely employed in various scanning recorders and scanning readers for applying a light beam which is deflected by a light deflector such as a galvanometer mirror, a rotating polygonal mirror, or a hologram scanner, to an object in a direction substantially normal to the direction in which the object is fed.

One example of such a scanning reader is an image scanning reading and reproducing system in which a recording medium with image information recorded thereon is scanned with a laser beam to photoelectrically read the recorded image information for thereby producing an image signal that is processed to reproduce a visible image on a photographic photosensitive material, a cathode-ray tube (CRT), or other medium. In order to accurately reproduce the photoelectrically converted image information as the visible image, a synchronizing signal must be generated in synchronism with the scanning cycle of the laser beam. More specifically, in the above system, the image information is photoelectrically read each time the laser beam moves a prescribed interval in a main scanning direction, and the image information is recorded on the recording medium such as a photographic photosensitive material while being kept in synchronism with the scanning position of the laser beam using the synchronizing signal.

Figure 1:
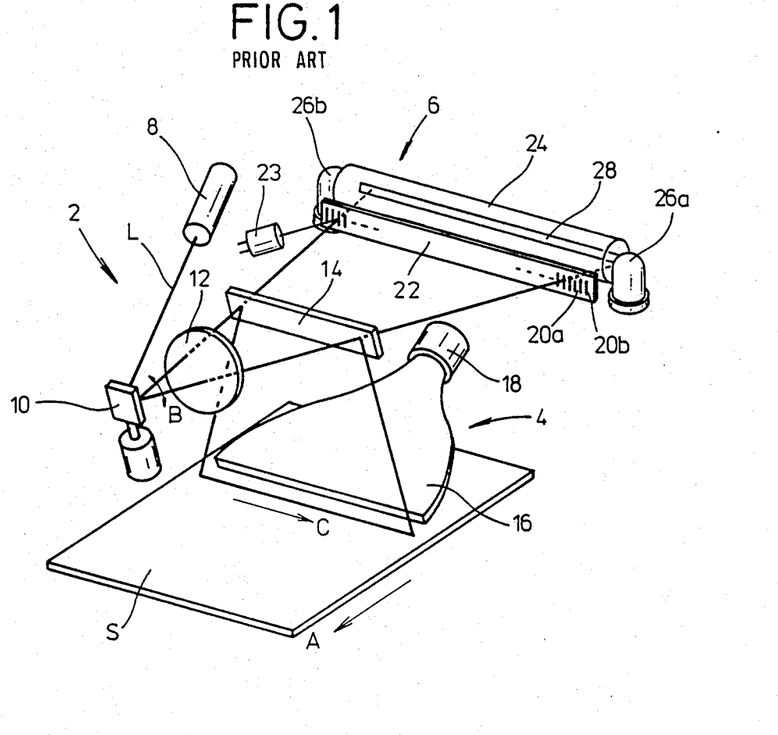
FIG. 1 is a schematic perspective view of a conventional light beam scanning apparatus.

FIG. 1 of the accompanying drawings illustrates a conventional light beam scanning apparatus having a mechanism for generating a synchronizing signal. The light beam scanning apparatus is incorporated in an image reader unit in an image scanning and reading system of the type described above.

The light beam scanning apparatus includes a laser beam scanner 2 for scanning a laser beam L over a sheet S of stimulable phosphor which is being fed in a subscanning direction (indicated by the arrow A), an image reader unit 4 for photoelectrically converting image information retrieved by the laser beam L to an image signal, and a synchronizing signal generator 6 for producing a synchronizing signal from the laser beam L. The stimulable phosphor is a phosphor capable of emitting light upon exposure to stimulating rays. More specifically, when it is exposed to a radiation such as X-rays, α-rays, β-rays, γ-rays, cathode rays, or ultraviolet rays, the phosphor stores a part of the energy of the radiation. When the phosphor exposed to the radiation is subsequently exposed to stimulating rays such as visible light, the phosphor emits light in proportion to the stored energy of the radiation. The stimulable phosphor sheet is a sheet having a layer of stimulable phosphor or a sheet made entirely of stimulable phosphor.

The laser scanner 2 includes a laser oscillator 8 for emitting the laser beam L, a galvanometer mirror 10 for deflecting or scanning the laser beam L in the direction of the arrow B, and a scanning lens 12 for uniformizing the scanning speed of the laser beam L that has been deflected by the galvanometer mirror 10. The laser beam L that has passed through the scanning lens 12 is reflected by a half-silvered mirror 14 serving as light deflecting means to scan the stimulable phosphor sheet S in a main scanning direction indicated by the arrow C. The half-silvered mirror 14 has its reflecting surface lying at an angle of 45° to the surface of the stimulable phosphor sheet S.

The image reader unit 4 comprises a transparent light guide 16 for collecting light emitted from the stimulable phosphor sheet S upon exposure to the laser beam L, and a photomultiplier 18 for photoelectrically converting the collected light to an electric image signal. The entrance surface of the light guide 16 through which the emitted light enters is disposed closely to the stimulable phosphor sheet S and extends along the main scanning direction thereof.

The synchronizing signal generator 6 comprises a grating 22 having a plurality of slits 20a for passing the laser beam L which has passed through the half-silvered mirror 14 and a plurality of narrow reflecting surfaces 20b for reflecting the laser beam L, the slits 20a and the reflecting surfaces 20b being alternately arranged in the scanning direction of the laser beam L, a light detector 23 for detecting the laser beam L which is reflected by the reflecting surfaces 20b of the grating 22, a solid cylindrical light guide 24 disposed behind and extending along the grating 22, and a pair of light detectors 26a, 26b disposed at the opposite ends, respectively, of the light guide 24 for detecting the laser beam L which has passed through the grating 22. The light guide 24 has an axially extending diffusion surface 28 on which the laser beam L falls.

The light beam scanning apparatus shown in FIG. 1 operates as follows:

The laser beam L emitted from the laser oscillator 8 is deflected by the galvanometer mirror 10 in the direction of the arrow B and applied to the stimulable phosphor sheet S through the scanning lens 12 and the half-silvered mirror 14. At this time, the laser beam L scans the stimulable phosphor sheet S in the main scanning direction indicated by the arrow C on swinging movement of the galvanometer mirror 10. The stimulable phoshpor sheet S is simultaneously fed in the subscanning direction indicated by the arrow A by a feed mechanism (not shown). As a result, the stimulable phosphor sheet S is two-dimensionally scanned by the laser beam L.

Upon exposure to the laser beam L, the stimulable phosphor sheet S emits light in proportion to image information recorded thereon. The emitted light then enters the transparent light guide 16 near the stimulable phosphor sheet S and is then applied to the photomultiplier 18, which photoelectrically converts the applied light to an electric image signal representative of the image information. The electric image signal is processed by a processor (not shown), and displayed on a display such as a CRT or recorded on a recording medium such as a magnetic tape.

The laser beam L that has passed through the half-silvered mirror 14 goes through the slits 20a of the grating 22 into the light guide 24 in which the laser beam L is diffused by the diffusion surface 28. The diffused laser beam L is totally reflected by the peripheral side surface of the light guide 24 to reach the light detectors 26a, 26b located at the opposite ends of the light guide 24. A light pulse signal represented by the laser beam L is photoelectrically converted by the light detectors 26a, 26b to a first synchronizing signal. The laser beam that has been reflected by a reflecting surface 22b positioned at one end of the grating 22 is detected by the light detector 23 and photoelectrically converted thereby to a second synchronizing signal. The first and second synchronizing signals are employed to synchronize the reproduction of image information which is photoelectrically converted by the photomultiplier 18.

The laser beam L which has passed through the slits 20a at the opposite ends of the grating 22 into the light guide 24 is diffused by the diffusion surface 28 and thereafter reaches the light detectors 26a, 26b directly or after being reflected back and forth several times by the peripheral side surface of the light guide 24. The laser beam L applied to a substantially central portion of the grating 22 is diffused by the diffusion surface 28 and thereafter detected by the light detectors 26a, 26b after being reflected back and forth much more times by the peripheral side surface of the light guide 24 (see FIG. 2).

Figure 2:
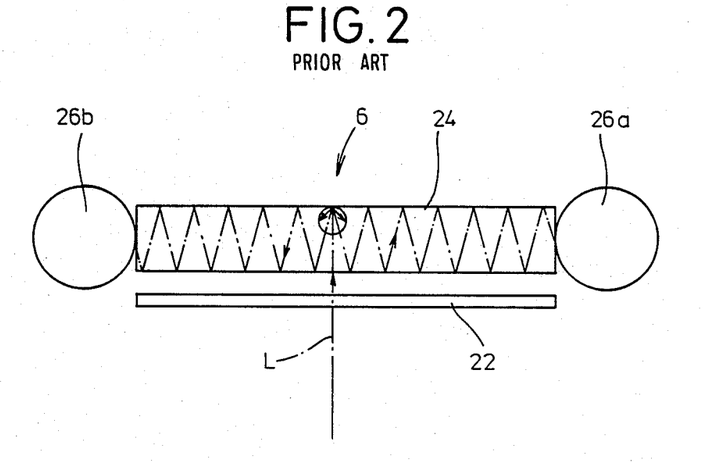
FIG. 2 is a plan view of a synchronizing signal generator in the light beam scanning apparatus shown in FIG. 1.

As the laser beam L is reflected back and forth within the light guide 24, however, the amount of the laser beam L is reduced due to reflection loss. When the laser beam L applied to the substantially central portion of the light guide 24 is repeatedly reflected many times within the light guide 24 as shown in FIG. 2, the amount of light having reached the light detectors 26a, 26b is largely attenuated. Therefore, the amount of the laser beam L applied to the grating 22 at its ends and reaching the light detectors 26a, 26b, and the amount of the laser beam L applied to the grating 22 at its center and reaching the light detectors 26a, 26b are widely different from each other. The difference between the amounts of light is such that the light detectors 26a, 26b may have difficulty in detecting the laser beam L passing through the central portion of the grating 22. As a result, the process of recording an image using a synchronizing signal generated from the light detectors 26a, 26b may be adversely affected.

One proposal to reduce the number of times at which the laser beam L is reflected back and forth in the light guide 24 would be to increase the diameter of the light guide 24. However, the light guide 24 of increased diameter would make the light scanning apparatus larger in size, and render the same difficult to manufacture. In order to prevent the light beam L from being scattered and attenuated in the light guide 24, the outer peripheral surface of the light guide 24 has to be finished highly accurately. Therefore, it would be tedious and time-consuming to grind the outer peripheral surface of the larger-diameter light guide 24 to a desired finish.

The solid cylindrical light guide 24 may be replaced with a light guide disclosed in Japanese Laid-Open Patent Publication No. 60-111634 relating to "Radiation image information reading apparatus". In Japanese Laid-Open Patent Publication No. 60-111634, the light guide 16 shown in FIG. 1 is replaced with a hollow cylindrical light guide extending in the main scanning direction of the stimulable phosphor sheet S, and the light detectors are disposed respectively at the opposite ends of the light guide. The hollow cylindrical light guide has a first slit oriented in the scanning direction of the stimulable phosphor sheet S for passing stimulating light therethrough, and a second slit for receiving light emitted from the stimulable phosphor sheet S by exposure to the stimulating light, the light guide having an inner peripheral surface of mirror finish.

Light emitted from the stimulable phosphor sheet S upon exposure to stimulating light which enters through the first slit is introduced through the second slit into the light guide, and reflected back and forth within the light guide before the light is detected by the light detectors. One or both ends of the light guide are enlarged or radially spread to reduce the number of times at which the light is reflected within the light guide and also to reduce the degree of light attenuation, so that a desired quantity of light can be applied to the light detectors.

Therefore, where the light guide 24 of FIG. 1 is replaced with a hollow cylindrical light guide with at least one end thereof enlarged or radially spread, the laser beam L that has passed through the central portion of the graing 22 is reflected back and forth a reduced number of times within the hollow cylindrical light guide and applied to the light detectors 26a, 26b. The inner peripheral surface of the hollow cylindrical light guide must however be of a mirror finish.

SUMMARY OF THE INVENTION

The present invention has been made in an effort to simplify the structure of a light guide used and increase the light reflection efficiency thereof.

It is an object of the present invention to provide a light scanning apparatus for scanning a light beam by deflecting the same with a light deflector, wherein a light guide for directing, toward a light detector, either light emitted by applying the scanning light beam to an object and indicative of image information or a synchronizing light beam divided from the scanning light beam, is of an elongate shape of rectangular cross section having at least one outwardly spreading end at which the light detector is disposed, the arrangement being such that the emitted light or the synchronizing light beam which has entered the light guide is totally reflected in the light guide by an inclined surface thereof progressively inclined in a direction toward the spread end, so as to be directed toward the light detector, whereby the number of times at which the emitted light or the synchronizing light beam is reflected in the light guide is reduced to enable the light guide to collect light with increased efficiency, and the light guide is simple in structure and manufactured economically.

It is a primary object of the present invention to provide a light beam scanning apparatus comprising light beam deflecting means for deflecting a light beam, an elongate light guide of rectangular cross section having an entrance surface for receiving the light beam or light emitted from an object scanned by the light beam, the entrance surface extending substantially perpendicularly to the light beam or the emitted light, the light guide also having a diffusion surface for diffusing the light beam or the emitted light, and at least one outwardly spread end to provide the light guide with a progressively spread shape, and light detecting means disposed at the spread end of the light guide, the arrangement being such that light having entered the light guide through the entrance surface can be diffused by the diffusion surface and reflected by the progressively spread shape toward the light detecting means.

The above and other objects, features and advantages of the present invention will become more apparent from the following description when taken in conjunction with the accompanying drawings in which preferred embodiments of the present invention are shown by way of illustrative example.

DETAILED DESCRIPTION OF THE PREFERRED EMBODIMENTS

Figure 3:
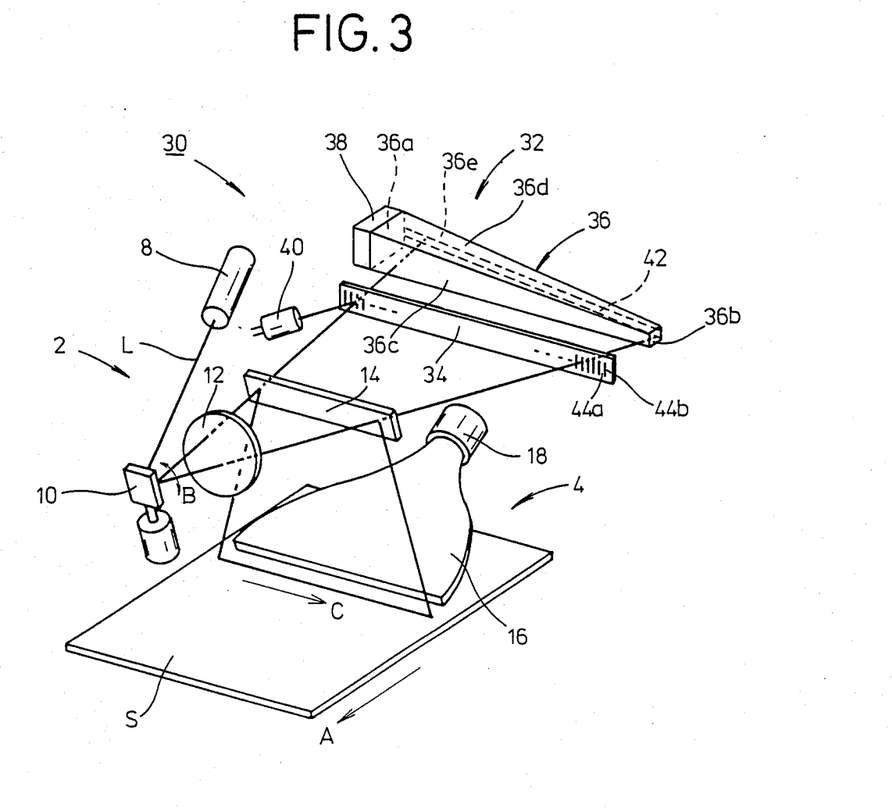
FIG. 3 is a schematic perspective view of a light beam scanning apparatus according to the present invention.

FIG. 3 shows a light beam scanning apparatus, generally designated by the reference numeral 30, according to the present invention. Those parts in FIG. 3 which are identical to those shown in FIG. 1 are denoted by identical reference numerals, and will not be described in detail.

The light beam scanning apparatus 30 includes a synchronizing signal generator 32 which essentially comprises a grating 34, an elongate light guide 36 of rectangular cross section for collecting a laser beam L that has passed through the grating 34, a first light detector 38 positioned at one end of the light guide 36 for photoelectrically converting the laser beam L that has passed through the grating 34 to a first synchronizing signal, and a second light detector 40 for photoelectrically converting the laser beam L that has been reflected by the grating 34 to a second synchronizing signal. The grating 34 has alternate slits 44a and reflecting surfaces 44b.

The light guide 36 is substantially in the form of a quadrangular prism made of an optically transparent material, preferably acrylic resin. The light guide 36 is required to be optically transparent to the extent that its material does not cause absorption loss with respect to the light beam used. The light guide 36 has rectangular opposite end faces 36a, 36b, the end face 36a being of a larger area than the end face 36b. The light guide 36 also has a laser beam entrance side surface 36c lying parallel to the grating 34, and an upper side surface 36d lying perpendicularly to the entrance side surface 36c and inclined progressively upwardly in a direction away from the end face 36b toward the end face 36a. A rear side surface 36e opposite to the entrance side surface 36c is inclined progressively away from the entrance side surface 36c in the direction away from the end face 36b toward the end face 36a. The rear side surface 36c has a diffusion surface 42 of a prescribed width deposited thereon as a coated layer of barium sulfate, titanium white, or the like. The first light detector 38 is positioned near the end face 36a of the light guide 36.

Operation and advantages of the light beam scanning apparatus thus constructed will be described below.

The scanning process of the light beam scanning apparatus 30 will be described only briefly as it is basically the same as that of the conventional light beam scanning apparatus shown in FIG. 1.

A stimulable phosphor sheet S on which image information of an object (not shown) is recorded by exposure to an X-ray or the like is fed in the subscanning direction indicated by the arrow A by a feed mechanism (not shown). The laser beam L emitted from the laser oscillator 8 is applied to the surface of the stimulable phosphor sheet S while the laser beam L is sweeping in the main scanning direction indicated by the arrow C, to enable the stimuable phosphor sheet S to emit light in proportion to the image information recorded thereon. The emitted light is applied through the light guide 16 disposed along the main scanning direction to the photomultiplier 18 which then converts the light to an electric image signal.

The laser beam L that has passed through the half-silvered mirror 14 is applied to the grating 34 of the synchronizing signal generator 32. The laser beam L having passed through the half-silvered mirror 14 is first reflected by the reflecting surfaces 44b of the grating 44 to fall on the second light detector 40 which photoelectrically converts the laser beam to a synchronizing signal, which is employed to synchronize scanning starting points for the laser beam L in the main scanning direction.

The laser beam L is scanned in the direction of the arrow B to move from one end to the other of the grating 34 in response to swinging movement of the galvanometer mirror 10.

The laser beam L that has passed through the slits 44a of the grating 44 enters the light guide 36 through its entrance side surface 36c and is then diffused in various directions by the diffusion surface 42 on the rear side surface 36e. The diffused laser beam L is totally reflected within the light guide 36 until it reaches the first light detector 38 that photoelectrically converts the laser beam L to a synchronizing signal.

Figure 4:
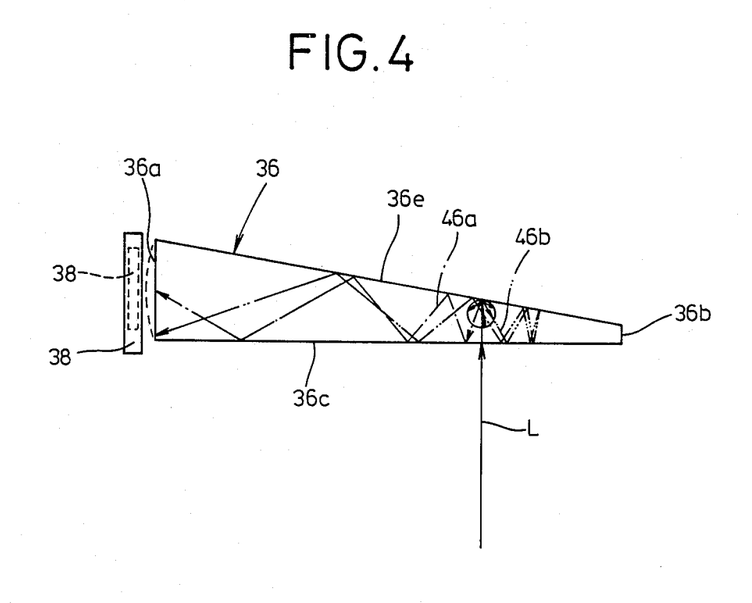
FIG. 4 is a plan view of a synchronizing signal generator in the light beam scanning apparatus shown in FIG. 3.

Since the surfaces 36d, 36e of the light guide 36 are inclined, the laser beam L that has passed through the slits 44a of the grating 34 and entered the light guide 36 is efficiently directed to the first light detector 38. More specifically, as shown in FIG. 4, the laser beam L introduced into the light guide 36 through the entrance side surface 36c is reflected into various different directions through the diffusion surface 42. A light ray 46a, indicated by the dot-and-dash line in FIG. 4, which is reflected by the diffusion surface 42 for travel toward the end face 36a is first reflected by the side surface 36c back toward the side surface 36e. Inasmuch as the side surface 36e is inclined progressively away from the side surface 36c in the direction toward the first light detector 38, the reflected light ray 46a is reflected by the side surface 36e more toward the end face 36a than would be if the side surface 36e were parallel to the side surface 36c. The reflected light ray 46a is reflected again by the side surface 36c and then by the side surface 36e progressively more toward the end face 36a until finally the light ray 46a arrives at the first light detector 38.

Since the reflected light ray 46a is reflected by the inclined side surface 36e progressively more toward the end face 36a, the number of times at which the light ray 46a is reflected within the light guide 36 is far smaller than would be if the side surfaces 36c, 36e were parallel to each other. As a consequence, the reflected light ray 46a can be directed to the first light detector 38 highly efficiently without being subjected to a substantial reflection loss.

Another light ray 46b (indicated by the two-dot-and-dash line in FIG. 4) is reflected by the diffusion surface 42 for travel toward the end face 36b. However, the light ray 46b is directed progressively less toward the end face 36b each time it is reflected by the inclined side surface 36e. After the light ray 46b is reflected twice by the side surface 36e, as shown in FIG. 4, the light ray 46b is directed back for travel generally toward the end face 36a. Therefore, the reflected light ray 46b is eventually applied through the end face 36a to the first light detector 38 in the same manner as the light ray 46a. As a result, the reflected light rays of the laser beam L diffused by the diffusion surface 42, even if they are first reflected for travel generally toward the end face 36b, are caused to reach the first light detector 38 through the end face 36a. Accordingly, the light guide 36 has a high degree of efficiency for collecting the laser beam L.

It can readily be understood that the laser beam L which has entered the light guide 36 can also be directed efficiently toward the first light detector 38 by the other inclined surface 36d. Where a light reflecting mirror or layer is mounted on the end face 36b, any reflected light rays which have reached the end face 36b within the light guide 36 can be redirected toward the first light detector 38. Thus, the light guide 36 with such a light reflecting mirror has higher light collecting efficiency.

The light entrance surface of the first light detector 38 may be held in intimate contact with the end face 36a of the light guide 36 to eliminate any air layer between the light guide 36 and the first light detector 38. With this arrangement, light having entered the light guide 36 can more efficiently be guided toward the first light detector 38. A layer of vaseline, grease, or the like which has substantially the same refractive index as that of the material of the light guide 36 may be interposed between the light guide 36 and the first light detector 38 for eliminating surface reflection loss to allow effective light transmission.

Where the size of the light entrance surface of the first light detector 38 is smaller than the size of the end face 36a the end face 36a may be of a partly spherical shape projecting toward the first light detector 38 to provide a lens effect for efficiently guiding light from the light guide toward the first light detector 38.

Figure 5:
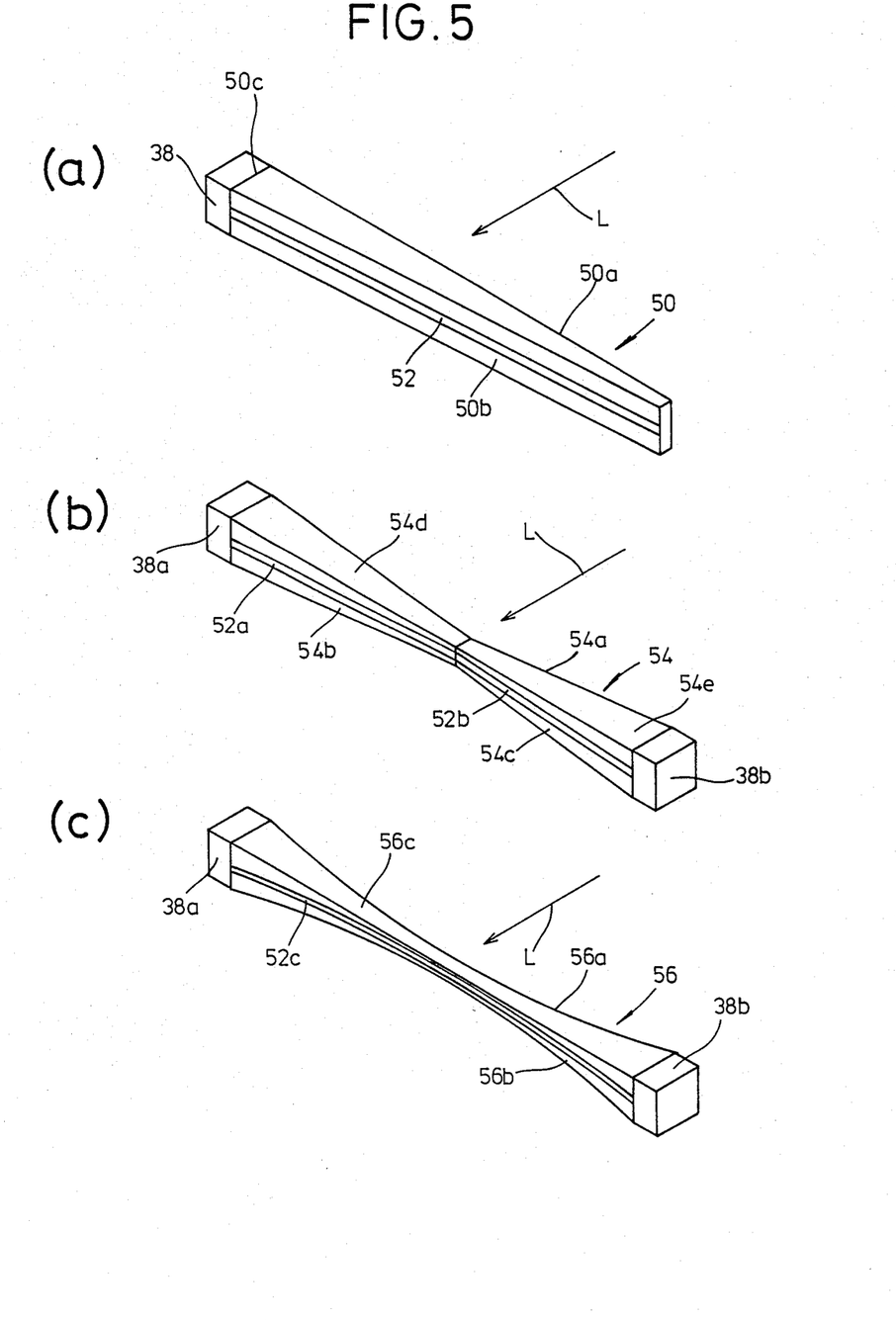
FIGS. 5(a), 5(b) and 5(c) are perspective views of synchronizing signal generators in light beam scanning apparatus according to other embodiments of the present invention.

Light guides according to other embodiments are shown in FIGS. 5(a) through 5(c). A light guide 50 according to a second embodiment shown in FIG. 5(a) has a rear side surface 50b opposite to an entrance side surface 50a through which the laser beam L enters the light guide 50. Only the side surface 50b is inclined with respect to the entrance side surface 50a or a direction normal to the laser beam L. The laser beam L that has entered the light guide 50 is first diffused by a diffusion surface 52 on the side surface 50b and then directed by the inclined side surface 50b for travel efficiently toward the light detector 38 on a larger end face 50c of the light guide 50.

FIG. 5(b) illustrates a light guide 54 according to a third embodiment which is similar to a combination of two coupled light guides of the first embodiment with their smaller end faces joined to each other. The light guide 54 has a pair of rear side surfaces 54b, 54c opposite to an entrance side surface 54a to which the laser beam L is applied, and a pair of upper surfaces 54d, 54e normal to the entrance side surface 54a. The rear side surfaces 54b, 54c and the upper surfaces 54d, 54e are inclined progressively outwardly in respective directions away from the center of the light guide 54. The light detectors 38a, 38b are mounted on the opposite ends of the light guide 54. When the laser beam L applied to the light guide 54 is moved in a direction from the light detector 58a toward the center of the light guide 54, the laser beam L is first diffused by a diffusion surface 52a on the side surface 54b, and then directed toward the light detector 38a. When the laser beam L applied to the light guide 54 is moved from the center of the light guide 54 toward the light detector 38b, the laser beam L is first diffused by a diffusion surface 52b on the side surface 54c, and then directed toward the light detector 38b.

According to a fourth embodiment shown in FIG. 5(c), a light guide 56 is substantially similar to the light guide 54 shown in FIG. 5(b). The light guide 56 has a rear side surface 56b opposite to a laser beam entrance side surface 56a and an upper surface 56c normal to the entrance side surface 56a. The surfaces 56b, 56c are curved or spread progressively outwardly in respective directions away from the center of the light guide 56. The laser beam L applied to the light guide 56 is first diffused by a diffusion surface 52c on the side surface 56b and then directed toward the light detector 38a or 38b dependent on the position where the laser beam L is applied to the light guide 56.

In the above embodiments, the light guides 36, 50, 54, 56 are employed in the synchronizing signal generator 32 of the light beam scanning apparatus 30. However, each of these light guides may be used in an image reader unit for transmitting light to a photomultiplier. In this alternative, the light guide 36 is disposed to extend along the main scanning direction (indicated by the arrow C) of the stimulable phosphor sheet S, with the side surface 36c positioned closely to the surface of the stimulable phosphor sheet S. When the surface of the stimulable phosphor sheet S is scanned in the main scanning direction C with the laser beam L reflected by the half-silvered mirror 14, light emitted from the stimulable phosphor sheet S enters the light guide 36 through the side surface 36c. The light is then totally reflected within the light guide 36 until it reaches the photomultiplier mounted on the end face 36a, so that the light can be photoelectrically read by the photomultiplier.

With the arrangement of the present invention, as described above, the light guide of a prismatic shape for guiding a laser beam having passed through the grating to the light detector to produce a synchronizing signal for image recording, or for guiding light indicative image information emitted by applying a scanning beam to a recording medium to the light detector, has an outwardly spread or larger end on which the light detector is mounted. A light beam that has entered the light guide is reflected for travel toward the light detector by a side surface of the light guide which is inclined progressively outwardly in a direction toward the outwardly spread end. Therefore, the number of times at which the light beam is reflected within the light guide is greatly reduced. Consequently, it is possible to guide the light beam efficiently toward the light detector while reducing reflection loss in the light guide, and hence a synchronizing signal can reliably be generated so that images can be read and recorded highly accurately. Inasmuch as the light guide is generally of a prismatic configuration, the light guide is simple in structure, allowing the light scanning apparatus to be manufactured economically.

Although certain preferred embodiments have been shown and described, it should be understood that many changes and modifications may be made therein without departing from the scope of the appended claims.

What is claimed is:

1. A light beam scanning apparatus comprising:
light beam deflecting means for deflecting a light beam;
an elongate light guide of rectangular cross section having an entrance surface for receiving said light beam or light emitted from an object scanned by said light beam, said entrance surface extending substantially perpendicularly to said light beam or said emitted light, said light guide also having a diffusion surface for diffusing said light beam or said emitted light, and at least one outwardly spread end to provide said light guide with a progressively spread shape; and
light detecting means disposed at said spread end of the light guide, the arrangement being such that light having entered said light guide through said entrance surface can be diffused by said diffusion surface and reflected by said progressively spread shape toward said light detecting means, wherein said light guide includes at least a pair of surfaces curved progressively in a direction from a substantially central portion of said light guide toward opposite ends thereof, said light detecting means being mounted on each of said opposite ends of the light guide.

2. A light beam scanning apparatus according to claim 1, further including a synchronizing signal generator including said light guide, said light detecting means, and an optical system for dividing said deflected light beam to produce a synchronizing light beam to be detected by said light detecting means to generate a synchronizing signal, said synchronizing signal generator also including a grating for passing said synchronizing light beam therethrough into said light guide so that the synchronizing light beam having passed through said grating into said light guide can be reflected by said progressively spread shape toward said light detecting means to enable the latter to generate said synchronizing signal.

3. A light beam scanning apparatus according to claim 1, further including an image reader unit including said light guide and said light detecting means for detecting said emitted light from said object to produce an electric signal indicative of image information of said object, said entrance surface of said light guide extending along a direction in which said object is scanned by said light beam so that said emitted light can be introduced into said light guide through said entrance surface and reflected by said progressively spread shape toward said light detecting means to enable the latter to generate said electric signal.

4. A light beam scanning apparatus comprising:
light beam deflecting means for deflecting a light beam;
an elongate light guide of rectangular cross section having an entrance surface for receiving said light beam or light emitted from an object scanned by said light beam, said entrance surface extending substantially perpendicularly to said light beam or said emitted light, said light guide also having a diffusion surface for diffusing said light beam or said emitted light, and at least one outwardly spread end to provide said light guide with a progressively spread shape; and
light detecting means disposed at said spread end of the light guide, the arrangement being such that light having entered said light guide through said entrance surface can be diffused by said diffusion surface and reflected by said progressively spread shape toward said light detecting means, wherein said spread end of the light guide on which said light detecting means is disposed has a partly spherical surface projecting toward said light detecting means.

5. A light beam scanning apparatus according to claim 4, further including a synchronizing signal generator including said light guide, said light detecting means, and an optical system for dividing said deflected light beam to produce a synchronizing light beam to be detected by said light detecting means to generate a synchronizing signal, said synchronizing signal generator also including a grating for passing said synchronizing light beam therethrough into said light guide so that the synchronizing light beam having passed through said grating into said light guide can be reflected by said progressively spread shape toward said light detecting means to enable the latter to generate said synchronizing signal.

6. A light beam scanning apparatus according to claim 4, further including an image reader unit including said light guide and said light detecting means for detecting said emitted light from said object to produce an electric signal indicative of image information of said object, said entrance surface of said light guide extending along a direction in which said object is scanned by said light beam so that said emitted light can be introduced into said light guide through said entrance surface and reflected by said progressively spread shape toward said light detecting means to enable the latter to generate said electric signal.

7. A light beam scanning apparatus according to claim 4, wherein said light guide is of a substantially prismatic configuration and includes at least a pair of surfaces inclined progressively in a direction from one end to the other end of the light guide, said other end being said spread end, said light detecting means being mounted on said other end.

8. A light beam scanning apparatus according to claim 4, wherein said light guide is of a substantially quadrangular prismatic configuration and includes a first surface opposite to said entrance surface and a second surface normal to said entrance surface, said first and second surfaces being inclined progressively in a direction from one end to the other end of the light guide, said first side surface having a diffusion surface for diffusing said light beam or said emitted light.

9. A light beam scanning apparatus according to claim 1 or 4, further including a light reflecting layer on the end opposite to said spread end of the light guide.

10. A light beam scanning apparatus according to claim 4, wherein said light guide is of a substantially prismatic configuration and includes at least a pair of surfaces inclined progressively in a direction from a substantially central portion of said light guide toward opposite ends thereof, said light detecting means being mounted on each of said opposite ends of the light guide.

* * * * *